(12) United States Patent
Nagaoka et al.

(10) Patent No.: US 6,251,510 B1
(45) Date of Patent: Jun. 26, 2001

(54) PROPYLENE RESIN SHEET FOR THERMOFORMING AND PROCESS FOR PREPARING IT

(75) Inventors: Yoshinobu Nagaoka; Akihiko Egashira; Kazumasa Fujimura; Toshimitsu Hasegawa, all of Yokkaichi; Tomokazu Hirose, Yokohama; Hiroshi Kuzui, Yokohama; Toru Tagawa, Yokohama, all of (JP)

(73) Assignee: Japan Polychem Corporation, Tokyo-To (JP)

( * ) Notice: Subject to any disclaimer, the term of this patent is extended or adjusted under 35 U.S.C. 154(b) by 0 days.

(21) Appl. No.: 09/048,159

(22) Filed: Mar. 26, 1998

(30) Foreign Application Priority Data

Mar. 26, 1997 (JP) .................................................... 9-074024

(51) Int. Cl.$^7$ .............................. B32B 7/02; B32B 27/08; B05D 3/08; B05D 3/02
(52) U.S. Cl. ...................... 428/218; 428/36.91; 428/340; 428/516; 427/223; 427/384; 106/13
(58) Field of Search ................................... 428/516, 34.9, 428/36.91, 340; 106/13; 427/536, 539, 569, 223, 384; 523/169; 600/169; 2/435

(56) References Cited

U.S. PATENT DOCUMENTS

| | | | |
|---|---|---|---|
| 4,042,549 | * 8/1977 | Ahr et al. ............................ | 260/23 X |
| 4,551,484 | * 11/1985 | Radisch et al. ....................... | 523/169 |
| 4,623,587 | * 11/1986 | Ito et al. ............................... | 428/335 |
| 5,262,233 | * 11/1993 | Sudo et al. ............................ | 428/327 |
| 5,302,327 | * 4/1994 | Chu et al. .............................. | 264/22 |
| 5,451,460 | * 9/1995 | Lu et al. ................................ | 428/349 |
| 5,472,792 | * 12/1995 | Tsurutani et al. .................... | 428/516 |
| 5,814,684 | * 9/1998 | Yoshioka .............................. | 523/169 |

FOREIGN PATENT DOCUMENTS

| | | |
|---|---|---|
| 54-099180 | * 8/1979 | (JP) . |
| 8-092399 | * 4/1996 | (JP) . |
| 0346208 | * 12/1996 | (JP) . |
| 10-139907 | * 5/1998 | (JP) . |

* cited by examiner

*Primary Examiner*—Paul Thibodeau
*Assistant Examiner*—Kevin R. Kruer
(74) *Attorney, Agent, or Firm*—Oblon, Spivak, McClelland, Maier & Neustadt, P.C.

(57) ABSTRACT

There is provided a process for preparing a resin sheet for thermoforming which can be fabricated into containers and lids or caps for containers in the food packaging industries, particularly those which are resistant to heating in a microwave oven, which containers and lids or caps are excellent in transparency, antifog property, impact resistance, and heat resistance are obtained.

A process for preparing an antifogged sheet comprising a propylene resin sheet with an antifogging agent comprising a polyglycerol fatty acid ester or a sucrose fatty acid ester as an effective ingredient.

23 Claims, No Drawings

PROPYLENE RESIN SHEET FOR THERMOFORMING AND PROCESS FOR PREPARING IT

BACKGROUND OF THE INVENTION

1. Field of the Invention

The present invention relates to a process for preparing or producing propylene resin sheets for thermoforming, which sheets are excellent in antifog property, transparency, rigidity and thermoforming property. Particularly, the present invention provides propylene resin sheets for thermoforming having a thermoforming property afforded thereto superior to the conventional ones and having antifog property, transparency and high rigidity in the production of transparent containers or lids used in the food industry.

2. Background Art

Sheet products made of plastic materials such as polystyrene or polyethylene terephthalate excellent in transparency are extensively used as containers or lid for containers because of their advantage that the content in the containers is easily identified. Recently, due to the increase in the use of frozen foods and foods to be heated in a microwave oven, containers or lid for containers made of sheets of such resins, however, have caused the problems of breakage or melting during the heating in a microwave oven, and thus transparent materials having antifog property, impact resistance, heat resistance as well as high rigidity have been requested by manufacturers of containers or lids.

On the other hand, propylene resin sheets excellent in heat resistance and impact resistance can be made transparent if materials and the processing used are adequately selected, but still have a problem that, when used as a lid material it may be difficult to identify therethrough the contents since its surface is hydrophobic and thus clouded with the water vapor from the contents.

There have been proposed such means for affording the antifog property to propylene resin sheets and the thermoformed articles made of the sheets as the use of propylene resin sheets having various antifogging agents blended in the resins or the use of propylene resin sheets having liquid antifogging agents applied thereon. However, propylene resin sheets and thermoformed articles made of the sheets such as containers or lids having satisfactory antifog property have not been presented yet as described below in more detail.

When containers are prepared from sheets of propylene resins having antifogging agents blended by the hot plate air-pressure forming, a propylene-ethylene random copolymer resin, for example as the propylene resin, can be formed into containers at a relatively wide range of forming temperatures, but there remain the problems that the rigidity of the containers formed would be lowered and/or the surface of the containers would be clouded due to the bleeding of the blended antifogging agent onto the surface of the sheet; that, when the containers are being thermoformed, the antifogging agent blended in the sheet would be transferred to the hot plate thereby clogging the pores (0.2 mm) for the application of vacuum or pressure in a mold to interrupt the continuous container forming operation; and that, when propylene resins having high rigidity and high crystallinity are used, pressure forming with a heating plate can be practiced only at a very narrow forming temperature range, whereby the antifogging agent blended is inhibited from bleeding at the crystalline part, so that the antifogging effect will not be exhibited.

In the method of coating containers with an antifogging agent, on the other hand, antifogging agents comprising sucrose fatty acid esters of lauric acid as their fatty acid residue have been used extensively (Japanese Patent Laid-Open Publication Nos. 166234/1981 and 80431/1982, and Japanese Patent Publication No. 36864/1986), but these antifogging agents have such problems that they have low heat resistant temperatures, and thus thermoformed articles such as containers or lids for containers which have been prepared by the thermoforming of propylene resin sheets having an antifogging agent applied thereon would not have antifog property endowed; and that if the amount of the antifogging agent is increased in order to improve antifog property, transparency would be lowered, the blocking of the coated sheet is frequently occurs, or the cost of the sheet is raised. There have been thus a demand for high-rigidity propylene resin sheets appropriate to the processing by the pressure forming with a hot plate and also for heat resistant antifogging coatings which are resistant to temperatures at the thermoforming.

SUMMARY OF THE INVENTION

The object of the present invention is to provide a process for preparing a propylene resin sheet for thermoforming which meets the above described requirements such as antifog property and transparency as well as impact resistance and temperature resistance.

The present invention, in one aspect thereof, relates to a process for preparing a propylene resin sheet for thermoforming which comprises subjecting a propylene resin laminated sheet comprising an intermediate layer of a propylene resin having a density of 0.900 g/cm$^3$ or less and a melt flow rate in the range of 0.3 to 20 g/10 min and surface layers of a propylene resin laminated on both surfaces of the intermediate layer and having a density in the range of 0.903 to 0.920 g/cm$^3$ and a melt flow rate in the range of 0.3 to 20 g/10 min, the total thickness of the laminated sheet being in the range of 0.1 to 2 mm, and the total thickness of the both surface layers being ½ or less of the total thickness of the laminated sheet to oxidation treatment so that at least one surface of the laminated sheet is subjected to oxidation to have the wet surface tension in the range of 36 to 55 dyne/cm, and coating the treated surface with an antifogging agent comprising as an effective ingredient, a polyglycerol fatty acid ester which contains a saturated fatty acid having 12 to 16 carbon atoms in an amount of 70% by weight or more in relation to the constituent fatty acids and whose average degree of esterification is in the range of 12 to 24%.

The present invention, in another aspect thereof, relates to a process for preparing a propylene resin sheet for thermoforming which comprises subjecting a propylene resin laminated sheet comprising an intermediate layer of a propylene resin having a density of 0.900 g/cm$^3$ or less and a melt flow rate in the range of 0.3 to 20 g/10 min and surface layers a propylene resin laminated on both surfaces of the intermediate layer and having a density in the range of 0.903 to 0.920 g/cm$^3$ and a melt flow rate in the range of 0.3 to 20 g/10 min, the total thickness of the laminated sheet being in the range of 0.1 to 2 mm, and the total thickness of the both surface layers being ½ or less of the total thickness of the laminated sheet to oxidation treatment so that at least one surface of the laminated sheet is subjected to oxidation to have the wet surface tension in the range of 36 to 55 dyne/cm, and coating the treated surface with an antifogging agent which comprises, as an effective ingredient, a sucrose fatty acid ester which contains oleic acid and lauric acid in the constituent fatty acids in a molar ratio of 2:8 to 8:2.

The present invention also relates to a propylene resin thermoforming sheet prepared by these processes.

DETAILED DESCRIPTION OF THE INVENTION

The present invention is now described in detail herein below.

1. Antifogging Agent

Antifogging agents used in the present invention comprise, as an effective ingredient, a polyglycerol fatty acid ester, referred to hereinafter as PoGE, or a sucrose fatty acid ester, referred to hereinafter as SE.

(1) Polyglycerol fatty acid ester/PoGE

PoGE used in the present invention is prepared by the reaction of polyglycerol, referred to hereinafter as PoG, and a fatty acid, and the constituent fatty acids comprise 70% by weight or more, preferably 80% by weight or more, of saturated fatty acids having 12 to 16 carbon atoms. Specifically, lauric acid, myristic acid and palmitic acid can be used alone or as a mixture of the two or more in any ratios. Other fatty acids such as stearic acid and oleic acid may also be used in an amount of 30% by weight or less of the constituent fatty acids. If the fatty acid contains less than 12 carbon atoms, affinity to the propylene resin sheet is lowered. If the fatty acid contains more than 16 carbon atoms, solubility of the coating agent in water is lowered, so that an aqueous solution of a finish is hard to be prepared or the transparency of a highly transparent propylene resin sheet as a base is lowered.

The average degree of esterification is in the range of 12 to 24%, preferably 16 to 24%. If the average degree of esterification is less than 12%, antifog property is lowered. If it exceeds 24%, an aqueous solution of a finish is hard to be prepared or the transparency of a highly transparent propylene resin sheet as a base is lowered.

The average degree of esterification of PoGE is calculated from the amounts of fatty acids and PoG obtained from the saponification of PoGE. In this connection, if the sample contains unreacted PoG, it is necessary preliminarily to determine the content of the unreacted PoG in the sample and to subtract it from the calculated value of PoG.

Average degree of esterification (%)=[(moles of constituent fatty acids)]/[(total moles of hydroxyl groups in constituent PoG)]×100=[(FA/$M_{FA}$)/[(POG$_E$/$M_{POG}$)×(n+2)]]×100 wherein
FA: The amount of a fatty acid recovered upon saponification of the sample (g),
$M_{FA}$: The molecular weight of a fatty acid,
POG$_E$: The amount of PoG recovered upon saponification of a sample (g),
$M_{POG}$: The molecular weight of PoG ($M_{POG}$=74n+18),
n: The average polymerization degree of PoG.

PoG is prepared by any methods such as comprising adding a small amount of an acid or an alkali to glycerol and heating the mixture at an elevated temperature of 180° C. or more under an atmospheric or sub-atmospheric pressure. If necessary, additional treatments such as neutralization and desalting may be carried out after the reaction. The polymerization degree of PoG is not limited and may be any value, which is ordinarily 4 or more, more preferably in the range of 4 to 20, more preferably in the range of 6 to 12, in view of the safety as a food additive of PoGE which is an esterification product of PoG.

PoGE is prepared from PoG by the esterification reaction with a fatty acid or the transesterification reaction with a fatty acid ester, and these reactions are ordinarily carried out in the presence of an alkali at an elevated temperature of 130° C. or more. The reaction systems may be sub-atmospheric or atmospheric. If necessary, additional treatments such as neutralization and desalting may be carried out after the reaction. Esterification can be carried out enzymatically with an enzyme such as lipase. PoGE obtained can contain unreacted PoG, and may be subjected to a purification treatment such as the elimination of coloring matters or odorants by steam distillation. Furthermore, appropriate mixtures of PoGEs obtained under different reaction conditions can also be provided.

(2) Sucrose Fatty Acid Ester/SE

SE used in the present invention has a molar ratio of oleic acid to lauric acid in the constituent fatty acids in the range of 2:8 to 8:2. If the ratio of oleic acid exceeds 8, the transparency of the propylene resin sheet coated with SE is extensively lowered. If the ratio of oleic acid is less than 2, the antifog property is lowered.

SE used in the present invention may be the one containing the above described two fatty acids in one molecule or a mixture of SEs having the particular constituent fatty acid in a higher degree. In addition, SE has an average degree of esterification preferably in the range of 14 to 20%, more preferably in the range of 14 to 17%, and HLB preferably in the range of 11 to 16, more preferably in the range of 15 to 16.

In addition to PoGE and SE, various anionic surface active agents can be added to the antifogging agent used in the present invention. The anionic surface active agents include fatty acid salts, fatty acid-lactic acid ester salts, alkyl sulfonic acid salts, organic acid monoglyceride salts, and the like. As the fatty acids for constituting the fatty acid salts and the fatty acid-lactic acid ester salts, there are used the saturated, unsaturated or branched ones having 8 to 22 carbon atoms, which include specifically capric acid, caprylic acid, lauric acid, myristic acid, palmitic acid, stearic acid, arachidic acid, oleic acid, elaidic acid, ricinoleic acid, 2-butyloctanoic acid, 2-hydroxydecanoic acid, and the like. These fatty acids can be a mixture of the two or more fatty acids in any ratio. As the alkyl groups for constituting the alkylsulfonic acid salts, there are used straight chain or branched chain saturated hydrocarbyl groups having 10 to 20 carbon atoms. The organic acid monoglycerides include specifically acetic acid monoglyceride, succinic acid monoglyceride, citric acid monoglyceride, and lactic acid monoglyceride. Alkaline materials for constituting the salts include alkali metals such as sodium and potassium, alkaline earth metals such as magnesium, alkanolamines such as ethanolamine, and lower alkylamines such as tributylamine.

Among these salts, the fatty acid salts and the fatty acid-lactic acid ester salts are preferred, and the constituent fatty acids include preferably lauric acid, myristic acid, palmitic acid and oleic acid. The alkaline materials include preferably alkali metals, particularly potassium.

These anionic surface active agents are preferably added in an amount of 0.1 to 30% by weight in relation to PoGE or SE. If the amount of the anionic surface active agents when used is less than 0.1% by weight, the solution of the antifogging agent can be clouded when applied on a propylene resin sheet to deteriorate the transparency of the propylene resin sheet which is inherently highly transparent. Even if the anionic surface active agents are added in an amount of more than 30% by weight, the effect is not increased and thus economically expensive.

In the antifogging agent used in the present invention, the other additives such as various plasticizers, various stabilizers, lubricants, pigments, anti-blocking agents, viscosity modifiers, anti-foaming agents, UV absorbers, and color protecting agents may be used appropriately within the ranges that the antifog property is not lowered.

2. Propylene Resin Laminated Sheet

The propylene resin used on the surface layer of the laminated sheet comprises predominantly monomeric units of propylene. Specifically, it includes a propylene homopolymer, random or block copolymers of propylene having units of propylene of 97% by weight or more with an α-olefin such as ethylene, butene-1, pentene-1, hexene-1 or 4-methyl-pentene-1, or a mixture thereof, among which the propylene homopolymer is preferred.

The above described propylene resins have an MFR measured in accordance with JIS-K6758 (230° C., 2.16 kg load) in the range of 0.3 to 20 g/10 min, preferably 0.5 to 10 g/10 min, more preferably 1.5 to 10 g/10 min. If the MFR exceeds the above described range, the molding capabilities into the sheet or the containers are deteriorated; if the MFR is less than the above described range, surge is generated on the laminated sheet being formed thus causing non-uniform cross-section, and the deterioration of transparency and forming property.

The above described propylene resin has a density measured in accordance with JIS-K6758 (230° C.) in the range of 0.903 to 0.920 g/cm$^3$, preferably 0.905 to 0.915 g/cm$^3$. If the density is less than 0.903 g/cm$^3$, the rigidity is insufficient; if it exceeds 0.920 g/cm$^3$, the adhesion to a cooling roll at the sheeting process is bad and thus leads to poor transparency and brightness.

The propylene resin used in the intermediate layer of the laminated sheet, on the other hand, comprises primarily a propylene polymer, and has a content of a propylene polymer preferably of 60% by weight or more, more preferably 70% by weight or more. The propylene resin used specifically includes random or block copolymers of propylene having a propylene content of 99 to 90% by weight with an α-olefin such as ethylene, butene-1, pentene-1, hexene-1 or 4-methyl-pentene-1, or a mixture thereof, among which a propylene-α-olefin random copolymer is preferred.

The propylene copolymer has a propylene content of 99 to 90% by weight, preferably 98 to 94% by weight. If the propylene content is less than the lower limit, rigidity is lowered; if it exceeds the upper limit, the thermoforming capability into containers is deteriorated, and the transparency and luster will be insufficient.

The propylene copolymer has an MFR in the range of 0.3 to 20 g/10 min, preferably 0.5 to 10 g/10 min, more preferably 0.5 to 5 g/10 min. If the MFR exceeds the range, the impact strength of products is insufficient and the formability of containers is poor; if the MFR is less than the range, surge is generated on the laminated sheet and thus leads to the variation of thickness, poor transparency or the poor property of shaping into containers.

In addition, the propylene copolymer has a density of 0.900 g/cm$^3$ or less, and the thermoforming operational range will be narrower, if the density exceeds the range.

Also, a linear ethylene-α-olefin copolymer can be incorporated into the propylene resin as the intermediate layer of the laminated sheet. The linear ethylene-α-olefin copolymer used is preferably prepared by the high-pressure ionic polymerization, vapor phase polymerization or solution polymerization in the presence of a Ziegler compound or a metallocene compound of from 70 to 99% by weight, preferably 80 to 93% by weight of ethylene with 30 to 1% by weight, preferably 20 to 7% by weight of an α-olefin having 3 to 12 carbon atoms, and has a density (JIS K7112, method A) of 0.93 g/cm$^3$ or less, preferably 0.87 to 0.915 g/cm$^3$, more preferably 0.88 to 0.91 g/cm$^3$, and an MFR (JIS K7210, condition 4) of 0.1 to 50 g/10 min, preferably 0.5 to 20 g/10 min, more preferably 1.0 to 10 g/10 min. The ethylene-α-olefin copolymers having an MFR of higher or lower than the above described range will have excessively high or low melting viscosities thus leading to the poor compatibility with the propylene resin or to the inhibition of the fluidity balance with the surface layer, surge on the laminated sheet, so that non-uniform cross-section, and the deterioration of transparency and forming property are caused. In addition, if the density exceeds 0.93 g/cm$^3$, the transparency and impact strength of the sheet will be poor.

The linear ethylene-α-olefin copolymer is incorporated in an amount of preferably less than 40% by weight, more preferably less than 30% by weight in relation to the total amount of the propylene resin constituting the intermediate layer.

In addition, a nucleating agent may generally be incorporated into the propylene resin used as the intermediate layer and/or the surface layers of the laminated sheet. The nucleating agents used include aromatic carboxylate metal salts, aromatic phosphate metal salts, sorbitol derivatives, metal salts of rosin, and the like. Among these nucleating agents, aluminum p-t-butylbenzoate, sodium 2,2'-methylenebis(4,6-di-t-butylphenyl)phosphate, 1,3,2,4-di(p-methyl-benzylidene)-sorbitol, 1,3,2,4-di(p-ethyl-benzylidene)sorbitol, and sodium and/or potassium salts of rosin.

Furthermore, the nucleating agent is incorporated in an amount of 0.01 to 1 part by weight, preferably 0.05 to 0.8 part by weight, more preferably 0.07 to 0.6 part by weight in relation to 100 parts by weight of the propylene resin.

If the amount of the nucleating agent incorporated is lower than the above described range, transparent sheets are not obtainable or the sheets obtained may have insufficient rigidity thus leading to instable shape maintenance; if the amount exceeds the above described range, the mechanical properties are lowered, the improvement in the rigidity would not go higher, and the cost is undesirably raised.

A slip agent may generally be incorporated into the propylene resin used as the surface layer of the laminated sheet. It is not always necessary to incorporate the slip agent into the propylene resin used as the intermediate layer of the laminated sheet. The slip agents used include saturated or unsaturated fatty acid amides, saturated or unsaturated fatty acid bisamides, polyalkylene glycols, hydrogenated castor oils, or mineral powders, which may be used alone or as a mixture of two or more.

The fatty acid amides preferably include monoamides or bisamides of $C_8$–$C_{22}$ saturated straight chain fatty acids or unsaturated fatty acids, and specifically monoamides such as palmitamide, stearamide, behenylamide, oleylamide or erucylamide, or a mixture thereof are preferably used. Also, secondary amides such as N-oleylpalmitamide or N-stearylerucylamide may be used as the fatty acid amide. The fatty acid bisamides include those comprising mostly a $C_8$–$C_{22}$ N,N-methylenebisamide or an N,N-ethylenebisamdie, among which methylenebisamides of stearic acid, behenic acid, oleic acid, erucic acid, or the like or ethylenebisamides of stearic acid, oleic acid, erucic acid, or the like are preferably used. Furthermore, as the other slip agents, there are used polyalkylene glycols such as polyethylene glycol or polypropylene glycol, hydrogenated castor oil, mineral powders such as silica or talc.

The slip agent is incorporated in an amount of 0.01 to 1 part by weight, preferably 0.05 to 0.8 part by weight, more preferably 0.1 to 0.5 part by weight in relation to 100 parts by weight of the propylene resin.

If the amount of the slip agent incorporated is less than the above described range, severe increase of the blocking property of the sheets obtained would be found and, poor slip on a metal roll would be found whereby non-uniform peeling from the roll would take place resulting in uneven surfaces or inferior transparency. If the amount exceeds the above described range, the slip agent bleeds out to cause the clouding phenomenon of the sheet surface and thus the deterioration of transparency.

The propylene resin laminated sheet comprising the above described intermediate layer and the surface layers laminated on both sides of the intermediate layer has a thickness in the range of 0.1 to 2 mm, preferably 0.15 to 0.6 mm, more preferably 0.2 to 0.4 mm. If the thickness exceeds the range, transparency will be poor; if it is less than the range, it will become difficult to form a highly transparent sheet.

In addition, the surface layers has a thickness of ½ or less of the total thickness of the propylene resin laminated sheet. If the thickness exceeds the range, temperature range used in the pressure forming with a hot plate or vacuum forming will become narrow, and raindrops or wrinkles will be generated thus deteriorating the shaping property of a container obtained.

The propylene resin laminated sheets are not limited to those prepared by specific methods, but typical methods include the polishing method with a mirror roll, the air-knife method (including rolling), the metal mirror belt method (including a single or twin belt); the T die method where the laminate precursors are, after rapid cooling, pressed with a metal mirror belt to form laminates; the co-extrusion methods such as the inflation method, and the calender-roll method, provided that a propylene resin sheet having a surface luster of 90 or more and a total HAZE value of 10 or less is prepared.

If the luster or the HAZE value exceed or is below the ranges, the transparency will be poor and thus it will become difficult to identify the content in the container formed therefrom.

3. Propylene Resin Sheet for Thermoforming

The surface of the propylene resin laminated sheet to be coated with an antifogging agent requires to be subjected to oxidation treatment such as corona discharge, ozone treatment, or flame treatment in order to improve the adhesion between the surface and the antifogging agent, and oxidation treatment is carried out so that the surface of the sheet to be coated will have the wet tension in the range of 36 to 55 dyne, preferably 36 to 45 dyne. If the wet tension is too large due to an excessive ozone treatment, the treated sheet has a smell of ozone, which remains also in a food container fabricated; if the wet tension is too small, the coatability of the sheet with the antifogging agent is affected adversely.

When SE is used as an effective ingredient of the antifogging agent, one side of the laminated sheet may be oxidized as described above; when PoGE is used at least one side of the laminated sheet may be oxidized as described above.

The antifogging agent comprising PoGE or SE used in the present invention is generally applied as a solution having 0.01 to 5% by weight of the antifogging agent, and the sheet is coated with it and then dried. As the solvent in the antifogging agent solution, use is made of solvents which dissolve the antifogging agent but do not dissolve the propylene resin laminated sheet and meet the safety requirements depending on its application fields such as water or an alcohol. The antifogging agent is preferably applied on the sheet in an amount of the solid antifogging agent component in the range of 0.05 to 2 $g/m^2$. If the amount of the antifogging agent is less than the range, the antifogging effect will be lowered; if the amount exceeds the range, the blocking between the sheets due to its stickiness and the lowering of the transparency due to the surface clouding of the antifogging agent after the forming of containers will be caused.

The application method of the antifogging agent may be either a variety of roll printing methods, the dipping method or the blowing method. The application can be carried by in the in-line coating method, or by the out-line coating method carried out in the rewinding step after the sheet forming and winding steps.

The sheet, after the coating with the antifogging agent, is dried to give a propylene resin sheet for thermoforming. The drying method includes but is not limited to a method in which the sheet is passed through a drying furnace or oven heated with steam or by an electric means (preferably to 100° C. or more if the solvent used is water) to evaporate the solvent.

The method for preparing a thermoformed article from the propylene resin sheet for thermoforming obtained by the process of the present invention includes but is not limited to the methods of forming containers in which preliminary heating step (with rolls or indirect heating) is provided prior to the thermoforming, of the pressure forming with a heating plate, and of the forming methods by indirect heating (e.g. vacuum forming method, pressure forming method).

The temperatures for thermoforming the propylene resin sheet of the present invention depends on the forming methods, and the surface temperature of the sheet is usually in the range of 110 to 250° C., preferably 120 to 200° C. If the temperature is below the forming temperature range, the sheet will not be stretched satisfactorily and thus cannot be shaped into a container. If the temperature is higher than the range, raindrop (spots due to residual air) or wrinkles are generated in the containers formed, and the antifog property is lowered.

The present invention is now described in detail below with reference to examples in a non limitative way.

EXAMPLE 1

A mixture of 100 parts by weight of a propylene homopolymer having an MFR of 2.5 g/10 min and a density of 0.908 $g/cm^3$ (Mitsubishi Chemical Corp.; MITSUBISHI POLYPRO PY320H (trade name), m.p. 171° C.), 0.2 part by weight of DBS (1,3,2,4-di(p-ethylbenzylidene)sorbitol) (trade name: GELALL MD, Shin-Nihon Rikagaku K.K.) as a nucleating agent and 0.2 part by weight of erucylamide as a slip agent was extruded from an extruder having a diameter of 65 mmφ, while a mixture of a propylene-ethylene random copolymer having an MFR of 1.8 g/10 min and a density of 0.895 $g/cm^3$ (Mitsubishi Chemical Corp.; MITSUBISHI POLYPRO EX6BF (trade name), m.p. 164° C.) and 0.2 part by weight of the above described nucleating agent was extruded from an extruder having a diameter of 45 mmφ, so that these mixtures were melt extruded through a T die of a co-extruder equipped with a feed block for feeding two resin-three layers at a resin temperature of 240° C. and a sheet width of 700 mm to give a laminate of the propylene homopolymer/propylene-ethylene random copolymer/propylene homopolymer. The molten sheet was then introduced to a mirror roll at 50° C. provided with an air knife to cool and solidify it, the surface of the propylene homopolymer resin contacted with the mirror roll was subjected to oxidation treatment by corona discharge to give a two resin-three layer propylene resin laminated sheet of a propylene homopolymer/propylene-ethylene random copolymer/propylene homopolymer (30/240/30 μm) having a thickness of 0.30 mm and a width of 450 mm.

The flexural modulus of elasticity of the propylene resin laminated sheet thus obtained was measured in accordance with JIS-K6758, and the DuPont impact strength in accordance with ASTM-D2794.

Next, the surface of the propylene homopolymer resin of the propylene resin laminated sheet having been subjected to corona treatment was coated with an antifogging agent solution prepared as a 1.6% by weight aqueous solution of a polyglycerol fatty acid ester comprising lauric acid with an average degree of esterification of 22.6%, the coated surface was dried in a dryer at 120° C. to give a propylene resin sheet for thermoforming coated with 0.5 g/m² of the solid antifogging agent component.

Table 1 shows the antifog properties and transparencies of the thermoforming sheets thus obtained.

Furthermore, a container having a length of 13 cm, a width of 18 cm and a depth of 1 cm in which the surface coated with the antifogging agent was inside was formed from the sheet for thermoforming thus prepared by a pressure forming apparatus with a heating plate (manufactured by K.K. Asano Kenkyusho: KOSMIC MOLDER) at various heating plate temperatures of from 110 to 160 ° C. varied by 10° C. under the conditions of preliminary heating of 4 seconds, air pressure of 1 kg/cm², and cooling time of 5 seconds.

The observation with naked eyes of the formability, the antifog property and the transparency of the container obtained are shown in Table 1.

EXAMPLES 2–6

Comparative Examples 1–5

The sheets for thermoforming and containers were prepared and evaluated in the same manner as in Example 1 except that PoGEs having the average degrees of esterification and comprising fatty acid species or sucrose fatty acid esters (Mitsubishi Kagaku Foods K.K.: LWA1570 (trade name)), the surface treatments of the propylene resin laminated sheets, and the thicknesses of the laminated sheets were changed as shown in Table 1, and the results are shown in Table 1.

The wet tension, which is herein sometimes called interchangeably as the wet surface tension, is determined by the method of JIS K6768-1995 for TESTING METHOD OF WETTABILITY OF POLYETHYLENE AND POLYPROPYLENE FILMS.

TABLE 1

| | Surface layer | | | | | | | Intermediate layer | | | | | Laminated sheet | |
|---|---|---|---|---|---|---|---|---|---|---|---|---|---|---|
| | MFR g/10 min | Density g/cm³ | Ethylene content % by weight | Nucleating agent parts by weight | Slip agent parts by weight | Wet tension dyne/cm | Thickness mm | MFR g/10 min | Density g/cm³ | Ethylene content % by weight | Nucleating agent parts by weight | Thickness mm | Flexural modulus MPa | Du-Pont impact J |
| Example | | | | | | | | | | | | | | |
| 1 | 2.5 | 0.908 | 0 | 0.2 | 0.2 | 50< | 0.03 | 1.8 | 0.895 | 3.0 | 0.2 | 0.24 | 1750 | 2.5 |
| 2 | 2.5 | 0.908 | 0 | 0.2 | 0.2 | 50< | 0.03 | 1.8 | 0.895 | 3.0 | 0.2 | 0.24 | 1750 | 2.5 |
| 3 | 2.5 | 0.908 | 0 | 0.2 | 0.2 | 50< | 0.03 | 1.8 | 0.895 | 3.0 | 0.2 | 0.24 | 1750 | 2.5 |
| 4 | 2.5 | 0.908 | 0 | 0.2 | 0.2 | 50< | 0.03 | 1.8 | 0.895 | 3.0 | 0.2 | 0.24 | 1750 | 2.5 |
| 5 | 2.5 | 0.908 | 0 | 0.2 | 0.2 | 40 | 0.03 | 1.8 | 0.895 | 3.0 | 0.2 | 0.54 | 1800 | 2.5 |
| 6 | 2.5 | 0.908 | 0 | 0.2 | 0.2 | 50< | 0.03 | 1.8 | 0.895 | 3.0 | 0.2 | 0.24 | 1750 | 2.5 |
| Comparative Example | | | | | | | | | | | | | | |
| 1 | 2.5 | 0.908 | 0 | 0.2 | 0.2 | 50< | 0.03 | 1.8 | 0.895 | 3.0 | 0.2 | 0.24 | 1750 | 2.5 |
| 2 | 2.5 | 0.908 | 0 | 0.2 | 0.2 | 50< | 0.03 | 1.8 | 0.895 | 3.0 | 0.2 | 0.24 | 1750 | 2.5 |
| 3 | 2.5 | 0.908 | 0 | 0.2 | 0.2 | 50< | 0.03 | 1.8 | 0.895 | 3.0 | 0.2 | 0.24 | 1750 | 2.5 |
| 4 | 2.5 | 0.908 | 0 | 0.2 | 0.2 | 50< | 0.03 | 1.8 | 0.895 | 3.0 | 0.2 | 0.24 | 1750 | 2.5 |
| 5 | 2.5 | 0.908 | 0 | 0.2 | 0.2 | 50< | 0.03 | 1.8 | 0.895 | 3.0 | 0.2 | 0.24 | 1750 | 2.5 |

TABLE 1(bis)

| | Antifogging agent species | | | Sheet for thermoforming | | Container thermoformed | | | | | | | | |
|---|---|---|---|---|---|---|---|---|---|---|---|---|---|---|
| | Fatty acid species | Average degree of esterification (%) | Potassium laurate % by weight | Transparency | Antifog property | Formability of container on processing temperature used | | | | | | Transparency | Antifog property |
| | | | | | | 110 | 120 | 130 | 140 | 150 | 160 | | |
| Example | | | | | | | | | | | | | |
| 1 | Lauric acid | 22.6 | — | ◎ | ◎ | X | Δ | ○ | ○ | ○ | ○ | ○ | ○ |
| 2 | Myristic acid | 17.7 | — | ◎ | ◎ | X | Δ | ○ | ○ | ○ | ○ | ○ | ○ |

TABLE 1(bis)-continued

| | | Antifogging agent species | | Sheet for thermoforming | | Container thermoformed | | | | | | | | |
|---|---|---|---|---|---|---|---|---|---|---|---|---|---|---|
| | Fatty acid species | Average degree of esterification (%) | Potassium laurate % by weight | Transparency | Antifog property | Formability of container on processing temperature used | | | | | | Transparency | Antifog property |
| | | | | | | 110 | 120 | 130 | 140 | 150 | 160 | | |
| 3 | Myristic acid | 20.4 | — | ◎ | ◎ | X | Δ | ○ | ○ | ○ | ○ | ○ | ○ |
| 4 | Palmitic acid | 17.9 | — | ◎ | ◎ | X | Δ | ○ | ○ | ○ | ○ | ○ | ○ |
| 5 | Lauric acid | 22.6 | — | ○ | ◎ | X | Δ | ○ | ○ | ○ | ○ | ○ | ○ |
| 6 | Lauric acid | 22.6 | 4 | ◎ | ◎ | X | Δ | ○ | ○ | ○ | ○ | ○ | ○ |
| Comparative Example | | | | | | | | | | | | | |
| 1 | Lauric acid | 27.8 | — | X | X | X | Δ | ○ | ○ | ○ | ○ | X | X |
| 2 | Myristic acid | 8.0 | — | X | X | X | Δ | ○ | ○ | ○ | ○ | X | X |
| 3 | LWA 1570 | 22.6 | — | ◎ | ◎ | X | Δ | ○ | ○ | ○ | ○ | ○ | X |
| 4 | Uncoated | — | — | ◎ | X | X | Δ | ○ | ○ | ○ | ○ | ○ | X |
| 5 | Oleic acid | 17.8 | — | X | X | X | Δ | ○ | ○ | ○ | ○ | X | X |

For the evaluation of transparency, antifog property and formability, see below.

EXAMPLES 7–11

Comparative Examples 6–9

The sheets for thermoforming and containers were prepared in the same manner as in Example 1 except that laminated sheets were prepared by blending the nucleating agents and the slip agent of erucylamide into the respective layers of the propylene resin laminated sheets, altering the types of the surface layer and the intermediate layer, or incorporating the resins specified in Table 2 into the intermediate layer in the ratios described in Table 2. The laminated sheets and the thermoformed sheets were evaluated in the same manner as in Example 1, and the results of evaluation of the formability, transparency and heat resistance of the containers are shown in Table 2.

In Table 2, the symbols or abbreviations shown in the column for the intermediate layer are as follows. LL-1: A polyethylene of MFR=2.0 g/10 min, density=0.920 g/cm$^3$ (Mitsubishi Chemical Corp.; MITSUBISHI POLYETHY-LL SF240 (trade name), m.p. 126° C.), LL-2: A linear low density polyethylene (LLDPE) of MFR=3.0 g/10 min, density =0.905 g/cm$^3$ (Mitsubishi Chemical Corp.; CARNEL64FTK (trade name), m.p. 103° C.), Rubber: MFR=3.6 g/10 min, density=0.89 g/cm$^3$ (Mitsui Petrochemical Industries Co., Ltd., TUFMER A-4085 (trade name)).

Comparative Example 10

A polyethylene terephthalate, PET, of a tradename of Eastar PETG 6763 having a density of 1.27 g/cm$^3$ was melt extruded from the T die provided in an extruder having a diameter of 65 mmφ at a resin temperature of 280° C. to form a sheet having a width of 500 mm and a thickness of 0.25 mm. It was then formed into a cooled and solidified PETG sheet having a width of 400 mm and a thickness of 0.25 mm by the polishing method, and a coated sheet and a coated container were prepared in the same manner as in Example 1. The results of evaluation are shown in Table 2 in the same manner as in Example 7.

TABLE 2

| | Surface layer | | | | | | | Intermediate layer | | | | | | Strength | |
|---|---|---|---|---|---|---|---|---|---|---|---|---|---|---|---|
| | | | | | | | | Propylene random copolymer | | | | Nucleating | | Flexural modulus MPa | DuPont impact J |
| | MFR g/10 min | Density g/cm$^3$ | Ethylene content % by weight | Nucleating agent parts by weight | Slip agent parts by weight | Wet tension dyne/cm | Thickness mm | MFR g/10 min | Density g/cm$^3$ | Ethylene content % by weight | LLDPE, etc. | agent parts by weight | Thickness mm | | |
| Example | | | | | | | | | | | | | | | |
| 7 | 2.5 | 0.908 | 0 | 0.4 | 0.1 | 50< | 0.03 | 1.8 | 0.895 | 3.0 | — | 0.2 | 0.24 | 1790 | 2.5 |
| | | | | | | | | | 100 | | — | | | | |
| 8 | 2.5 | 0.908 | 0 | 0.2 | 0.2 | 50< | 0.05 | 1.8 | 0.895 | 3.0 | LL-1 | 0.2 | 0.20 | 1550 | 3.0 |
| | | | | | | | | | 90 | | 10 | | | | |
| 9 | 2.5 | 0.908 | 0 | 0.2 | 0.2 | 50< | 0.03 | 1.8 | 0.895 | 3.0 | LL-2 | 0.2 | 0.24 | 1450 | 3.0< |
| | | | | | | | | | 70 | | 30 | | | | |
| 10 | 2.5 | 0.908 | 0 | 0.2 | 0.2 | 50< | 0.03 | 1.8 | 0.895 | 3.0 | Rubber | 0.2 | 0.24 | 1600 | 3.0 |
| | | | | | | | | | 9.5 | | 5 | | | | |

TABLE 2-continued

| | | | Surface layer | | | | | | Intermediate layer | | | | Strength | |
|---|---|---|---|---|---|---|---|---|---|---|---|---|---|---|
| | | | | | | | | | Propylene random copolymer | | | Nucleating | | Flex-ural mod-ulus MPa | Du-Pont im-pact J |
| | MFR g/10 min | Den-sity g/cm³ | Ethylene content % by weight | Nucleating agent parts by weight | Slip agent parts by weight | Wet tension dyne/cm | Thick-ness mm | MFR g/10 min | Den-sity g/cm³ | Ethylene content % by weight | LLDPE, etc. | agent parts by weight | Thick-ness mm | | |
| 11 Comparative Example | 10.0 | 0.910 | 0 | 0.2 | 0.2 | 50< | 0.03 | 6.0 | 0.894 100 | 2.0 | — — | 0.2 | 0.24 | 1850 | 2.3 |
| 6 | 2.4 | 0.896 | 3.0 | 0.2 | 0.2 | 46< | 0.03 | 2.5 | 0.908 | 0 | — | 0.2 | 0.24 | 1930 | 0.8 |
| 7 | 2.5 | 0.908 | 0 | 0.2 | 0.2 | 50< | 0.15 | 2.5 | 0.908 | 0 | — | 0.2 | 0 15 | 2100 | 0.5 |
| 8 | 1.8 | 0.895 | 3.0 | 0.2 | 0.2 | 46< | 0.15 | 1.8 | 0.895 | 3.0 | — | 0.2 | 0.15 | 800 | 3.0< |
| 9 | 2.5 | 0.908 | 0 | 0.2 | 0.2 | 50< | 0.03 | 1.8 | 0.895 | 3.0 | LL-2 | 0.2 | 0.24 | 1450 | 2.5 |
| 10 | | | PET | | | 50< | 0.15 | | PET | | — | — | 0.15 | 3750 | 3.0< |

TABLE 2(bis)

| | Antifogging agent species | | Sheet for transforming | | Containers formed | | | | | | | | Heat resistance (1) | Heat resistance (2) |
|---|---|---|---|---|---|---|---|---|---|---|---|---|---|---|
| | Fatty acid species | Average esterification rate (%) | Trans-parency | Antifog property | Formability of container depending on processing temperature | | | | | | Trans-parency | Antifog property | | |
| | | | | | 110 | 120 | 130 | 140 | 150 | 160 | | | | |
| Example | | | | | | | | | | | | | | |
| 7 | Lauric acid | 22.6 | ⊚ | ⊚ | X | Δ | ○ | ○ | ○ | ○ | ○ | ○ | ○ | ○ |
| 8 | Lauric acid | 22.6 | ○ | ⊚ | X | Δ | ○ | ○ | ○ | ○ | ○ | ○ | ○ | ○ |
| 9 | Lauric acid | 22.6 | ○ | ⊚ | X | Δ | ○ | ○ | ○ | ○ | ○ | ○ | ○ | ○ |
| 10 | Lauric acid | 22.6 | ⊚ | ⊚ | X | Δ | ○ | ○ | ○ | ○ | ○ | ○ | ○ | ○ |
| 11 | Lauric acid | 22.6 | ⊚ | ⊚ | X | Δ | ○ | ○ | ○ | ○ | ○ | ○ | ○ | ○ |
| Comparative Example | | | | | | | | | | | | | | |
| 6 | Lauric acid | 22.6 | ○ | ○ | X | X | Δ | Δ | X | X | ⊚ | ⊚ | ⊚ | ⊚ |
| 7 | Lauric acid | 22.6 | ○ | ○ | X | X | X | X | Δ | X | ⊚ | ⊚ | ⊚ | ⊚ |
| 8 | Lauric acid | 22.6 | ○ | ○ | Δ | ⊚ | ⊚ | Δ | X | X | ⊚ | ⊚ | ⊚ | ⊚ |
| 9 | Uncoated | | ⊚ | X | X | X | X | Δ | Δ | X | ⊚ | X | ⊚ | ⊚ |
| 10 | Lauric acid | 22.6 | ⊚ | ○ | X | X | Δ | X | X | X | ⊚ | ⊚ | ⊚ | X |

Heat resistance (1): The results of the haze variation of the container left standing at 45 C. for 2 weeks.
Heat resistance (2): The results of evaluation at heating in a microwave oven.

EXAMPLE 12

In SE having a molar ratio of lauric acid to oleic acid of 2:8 was incorporated an anionic surface active agent which was fatty acid-lactic acid ester salt so that the concentration of the anionic surfactant was 5.3% by weight. The corona treated surface of the propylene resin laminated sheet obtained in Example 1 was coated with a 0.4% by weight solution of the SE so modified as an antifogging agent in demineralized water by the gravure roll method, and the coated surface was dried in a dryer at 120° C. to give a coated laminated sheet having a solid antifogging agent content of 0.6 g/m². The laminated sheet and a container prepared from the laminated sheet thus prepared were evaluated in the same manner as in Example 1 except that the container having a length of 13 cm, a width of 18 cm and a depth of 1 cm in which the surface coated with the antifogging agent was inside was formed with the laminated sheet coated with the antifogging agent under the processing conditions of a surface temperature of the sheet at 170° C., preliminary heating of 11 seconds, air pressure of 1 kg/cm², and cooling time of 15 seconds in a vacuum forming method, referred to hereinafter as the VF method, by an apparatus manufactured by K.K. Asano Kenkyusho (trade name: KOSMIC MOLDER). The antifog property, transparency and blocking resistance of the sheet for thermoforming were evaluated, and the results are shown in Table 3.

EXAMPLES 13–16

Comparative Examples 11–13

Example 12 was repeated whereby the laminated sheets and the containers prepared from the laminated sheets were prepared and evaluated with reference to the formabilities, antifog properties and transparencies in the same manner as in Example 12 except that the concentration of anionic surface active agents in SEs comprising the fatty acid species shown in Table 3, the surface treatment of the propylene sheet, the thickness of the sheet, and the surface temperature of the sheet at the forming of the container were varied respectively. The results are shown in Table 3.

EXAMPLE 17

A container having a length of 13 cm, a width of 18 cm and a depth of 1 cm in which a surface of the thermoforming sheet obtained in Example 12 coated with the antifogging agent and the uncoated surface were inside was prepared by a method referred to hereinafter as the heating plate method, (manufactured by K.K. Asano Kenkyusho; trade name: KOSMIC MOLDER) where the coated surface and the uncoated surface were contacted with the surface of the heating plate in a pressure forming apparatus with a heating plate under the condition of heating plate temperature of 140° C. preliminary heating of 4 seconds, air pressure of 1 kg/cm$^2$, and cooling time of 15 seconds. The results of the evaluation carried out in the same manner as in Example 2 are shown in Table 3.

TABLE 3

|  | Surface layer ||||||| Intermediated Layer ||||| Laminated sheet ||
|  |  | | Nucleating | | | | | | | Ethylene | Nucleating | | | |
|  | MFR g/10 min | Density g/cm$^3$ | agent parts by weight | Slip agent parts by weight | Wet tension dyne/cm | Thick-ness mm | MFR g/10 min | Density g/cm$^3$ | content % by weight | agent parts by weight | Thick-ness mm | Flexural modulus MPa | DuPont impact J |
| Example |  |  |  |  |  |  |  |  |  |  |  |  |  |
| 12 | 2.5 | 0.908 | 0.2 | 0.2 | 50< | 0.03 | 1.8. | 0.895 | 3.0 | 0.2 | 0.24 | 1750 | 2.5 |
| 13 | 2.5 | 0.908 | 0.2 | 0.2 | 50< | 0.03 | 1.8 | 0.895 | 3.0 | 0.2 | 0.24 | 1750 | 2.5 |
| 14 | 2.5 | 0.908 | 0.2 | 0.2 | 50< | 0.03 | 1.8 | 0.895 | 3.0 | 0.2 | 0.24 | 1750 | 2.5 |
| 15 | 2.5 | 0.908 | 0.2 | 0.2 | 50< | 0.03 | 1.8 | 0.895 | 3.0 | 0.2 | 0.24 | 1750 | 2.5 |
| 16 | 2.5 | 0.908 | 0.2 | 0.2 | 40 | 0.03 | 1.8 | 0.895 | 3.0 | 0.2 | 0.54 | 1800 | 2.5 |
| 17 | 2.5 | 0.908 | 0.2 | 0.2 | 50< | 0.03 | 1.8 | 0.895 | 3.0 | 0.2 | 0.24 | 1750 | 2.5 |
| Comparative Example |  |  |  |  |  |  |  |  |  |  |  |  |  |
| 11 | 2.5 | 0.908 | 0.2 | 0.2 | 50< | 0.03 | 1.8 | 0.895 | 3.0 | 0.2 | 0.24 | 1750 | 2.5 |
| 12 | 2.5 | 0.908 | 0.2 | 0.2 | 50< | 0.03 | 1.8 | 0.895 | 3.0 | 0.2 | 0.24 | 1750 | 2.5 |
| 13 | 2.5 | 0.908 | 0.2 | 0.2 | 32 | 0.03 | 1.8 | 0.895 | 3.0 | 0.2 | 0.24 | 1750 | 2.5 |

TABLE 3(bis)

|  | Antifogging agent species |||| Coated sheet ||| Formed container ||||
|  | Molar ratio of lauric acid/oleic acid | Anionic surface active agent || Coat amount of solid matters (% by weight) | Trans-parency | Antifog property | Blocking resistance | Forming method | Forming temperature (° C.) | Form-ability | Trans-parency | Antifog property |
|  |  | Potassium laurate-lactate (% by weight) | Potassium laurate (% by weight) |  |  |  |  |  |  |  |  |  |
| Example |  |  |  |  |  |  |  |  |  |  |  |  |
| 12 | 2/8 | 5.3 | – | 0.6 | ◎ | ◎ | ○ | VF | 170 | ○ | ○ | ○ |
| 13 | 2/8 | 1.7 | – | 0.6 | ◎ | ◎ | ○ | VF | 170 | ○ | ○ | ○ |
| 14 | 2/8 | — | 4.1 | 0.6 | ◎ | ◎ | ○ | VF | 170 | ○ | ○ | ○ |
| 15 | 5/5 | 5.3 | – | 0.5 | ◎ | ◎ | ○ | VF | 170 | ○ | ○ | ○ |
| 16 | 8/2 | 5.3 | – | 0.6 | ◎ | ◎ | ○ | VF | 185 | ○ | ○ | ○ |
| 17 | 2/8 | 5.3 | – | 0.6 | ◎ | ◎ | ○ | Heating plate method*1 | 140 | ○ | ○ | ○ |

TABLE 3(bis)-continued

| | Antifogging agent species | | | | Coated sheet | | | Formed container | | | | |
|---|---|---|---|---|---|---|---|---|---|---|---|---|
| | Molar ratio of lauric acid/oleic acid | Anionic surface active agent | | Coat amount of solid matters (% by weight) | Trans-parency | Antifog property | Blocking resistance | Forming method | Forming temperature (°C.) | Form-ability | Trans-parency | Antifog property |
| | | Potassium laurate-lactate (% by weight) | Potassium laurate (% by weight) | | | | | | | | | |
| Comparative Example | | | | | | | | | | | | |
| 11 | 0/10 | 5.3 | — | 0.8 | X | Δ | ○ | VF | 140 | ○ | X | X |
| 12 | 10/0 | 5.3 | — | 0.6 | ○ | Δ | ○ | VF | 170 | ○ | ○ | X |
| 13 | 2/8 | — | — | 0.6 | X | X | ○ | VF | 250 | X | ○ | X |

*1 The uncoated surface at the heating surface.
For the evaluation of the blocking resistance, see below.

EXAMPLES 18–22

Comparative Examples 14–15

Sheets for thermoforming and containers were prepared in the same manner as in Example 12, except that laminated sheets were prepared by blending DBS as the nucleating agents and the slip agent of erucylamide into the respective layers of the propylene resin laminated sheets, altering the types of the surface layer and the intermediate layer, or incorporating LLDPE used in Examples 8–10 in the ratios described in Table 4. The results of evaluation are shown in Table 4.

TABLE 4

| | Propylene resin laminated sheet | | | | | | | | | | | | | |
|---|---|---|---|---|---|---|---|---|---|---|---|---|---|---|
| | Surface layer | | | | | | Intermediate layer | | | | | | Laminated sheet | |
| | MFR g/10 min | Den-sity g/cm³ | Ethylene content % by weight | Nucl-eating agent parts by weight | Slip agent part by weight | Wet sion ten-dyne/cm | Thick-ness mm | MFR g/10 min | Density g/cm³ | Ethylene content % by weight | LLDPE, etc. | Nucleating agent parts by weight | Thick-ness mm | Flexural modulus MPa | DuPont impact J |
| Example | | | | | | | | | | | | | | | |
| 18 | 2.5 | 0.908 | 0 | 0.4 | 0.1 | 50< | 0.03 | 1.8 | 0.895 100 | 0.3 | — | 0.2 | 0.24 | 1790 | 2.5 |
| 19 | 2.5 | 0.908 | 0 | 0.2 | 0.2 | 50< | 0.05 | 1.8 | 0.895 90 | 3.0 | LL-1 10 | 0.2 | 0.20 | 1550 | 2.9 |
| 20 | 2.5 | 0.908 | 0 | 0.2 | 0.2 | 50< | 0.03 | 1.8 | 0.895 70 | 3.0 | LL-2 30 | 0.2 | 0.24 | 1450 | 3.0< |
| 21 | 2.5 | 0.908 | 0 | 0.2 | 0.2 | 50< | 0.03 | 1.8 | 0.895 95 | 3.0 | Rubber 5 | 0.2 | 0.24 | 1600 | 2.9 |
| 22 | 10.0 | 0.910 | 0 | 0.2 | 0.2 | 50< | 0.03 | 1.8 | 0.895 100 | 3.0 | — | 0.2 | 0.24 | 1850 | 2.3 |
| Comparative Example | | | | | | | | | | | | | | | |
| 14 | 2.5 | 0.910 | 0 | 0 | 0.2 | 50< | 0.15 | 2.5 | 0.910 100 | 0 | — | 0 | 0.15 | 1450 | 0.8 |
| 15 | 2.5 | 0.908 | 0 | 0.2 | 0.2 | 50< | 0.03 | 1.8 | 0.895 70 | 3.0 | LL-2 30 | 0.2 | 0.24 | 1450 | 3.0< |

TABLE 4(bis)

| | Antifogging agent species | | | Coated sheet | | | Formed container | | | | |
|---|---|---|---|---|---|---|---|---|---|---|---|
| | Molar ratio of lauric acid/oleic acid | Anionic surface active agent Potassium laurate-lactate (% by weight) | Coat amount of solid matter (% by weight) | Transparency | Antifog property | Blocking resistance | Forming method | Forming temperature (° C.) | Formability | Transparency | Antifog property |
| Example | | | | | | | | | | | |
| 18 | 2/8 | 5.3 | 0.6 | ⊚ | ⊚ | ○ | VF | 170 | ○ | ○ | ○ |
| 19 | 2/8 | 5.3 | 0.6 | ○ | ⊚ | ○ | VF | 170 | ○ | ○ | ○ |
| 20 | 218 | 5.3 | 0.6 | ○ | ⊚ | ○ | VF | 170 | ○ | ○ | ○ |
| 21 | 218 | 5.3 | 0.6 | ⊚ | ⊚ | ○ | VF | 170 | ○ | ○ | ○ |
| 22 | 2/8 | 5.3 | 0.6 | ⊚ | ⊚ | ○ | VF | 170 | ○ | ○ | ○ |
| Comparative Example | | | | | | | | | | | |
| 14 | 2/8 | 5.3 | 0.6 | X | ⊚ | ○ | VF | 170 | X | X | ○ |
| 15 | | Uncoated | | ○ | X | ○ | VF | 170 | ○ | ○ | X |

The evaluation of the transparency, antifog property, blocking resistance, container formability, and heat resistance of the antifogging agent coated sheets and the antifogging agent coated containers was carried out according to the following methods.

(1) Transparency

Evaluation was carried out in accordance with JIS-K7105 by the degree of haze determined by a direct-reading haze meter manufactured by K.K. Toyo Seiki Seisakusho Japan, as well as by the visual observations of appearance, and judged as ⊚, ○, Δ and X by the following evaluation grades.

Evaluation Grade

The haze value is in the range of 0 to less than 5%, and no coating spots is observed: ⊚

The haze value is in the range of 5 to less than 10%, and a few spots are observed: ○

The haze value is in the range of 10 to less than 15%, and noticeable number of spots are observed: Δ

The haze value is in the range of 15% or more, and considerable number of spots are observed: X (2) Antifog Property A 100 yen coin was placed on the bottom in a glass in which 100 cc of hot water at 80° C. was contained, coated sheets or coated containers were provided on the edge of the glass to evaluate their antifog properties according to the following evaluation grades.

Evaluation Grade

No fog is observed, and the 100 yen coin can be identified clearly: ⊚

While no fog is observed, several large water drops are observed, and the 100 yen coin can be identified: ○

Less than 20% of the glass was fogged with fine water drops, and the 100 yen coin is hazed slightly: Δ

20% or more of the glass was fogged with fine water drops, and the 100 yen coin cannot be identified: X (3) Formability of Containers Containers having a length of 13 cm, a width of 18 cm and a depth of 1 cm in which the coated surface was inside were prepared by forming the propylene resin laminated sheet by varying the heating plate temperature of a pressure forming apparatus with a heating plate (manufactured by K.K. Asano Kenkyusho; trade name: KOSMIC MOLDER) every 10° C. from 110 to 160° C. under the condition of preliminary heating for 4 seconds, air pressure of 1 kg/cm$^2$, and cooling time for 5 seconds, and the formabilities of the containers obtained were evaluated according to the following evaluation grades.

Evaluation Grade

The container was clear, and the formability of the container obtained is good: ○

The corners of the container were rounded, and raindrops or wrinkles are generated on the surface of the container: Δ

The surface of the container is turbid, many wrinkles are generated, or the sheet cannot be shaped into the container due to insufficient preliminary heating: X (4) Heat Resistance Heat Resistance (1)

A lid for a container coated with an antifogging agent was left standing in an oven at 45° C. for 2 weeks, and a haze degree was measured in accordance with JIS K7105 by a direct-reading haze meter manufactured by K.K. Toyo Seiki Seisakusho and judged as ⊚, ○, Δ and X by the following evaluation grades.

Evaluation Grade

The haze degree is within the range of 0 to less than +1.5%: ○

The haze degree is within the range of +1.5 to less than +3%: Δ

The haze degree is +3% or more: X

Heat Resistance (2)

A lid for a container coated with an antifogging agent was put on a filler container in which 150 cc of water was contained, and heated for 5 minutes in a 1,500 W microwave oven, and the container was taken out from the oven to observe visually the deformation of the lid.

Evaluation Grade

No deformation nor cloudiness are observed in the lid: ○

The lid is deformed slightly, and thus is not fitted with the container: Δ

The lid is deformed to such an extent that it is difficult to restore the original dimension: X (5) Blocking Resistance Ten sets of sheets (150 mm×150 mm) coated with an antifogging agent were stacked so that the coated surface and the uncoated surface were in contact, and left standing at 40° C. and 60% RH for 2 weeks while a load (weight: 30 kg) was applied to the whole stack of sheets. Then, blocking resistance was evaluated by measuring the force required for peeling the sheets (between the coated surface and the uncoated surface) and observing the state of the peeled surface.

Evaluation Grade

Sheets are easily peeled off, and no change was observed on the surface having undergone peeling: ○

Sheets are peeled with slight stickiness, and a few white spots remain on the peeled surface: Δ

Sheets are peeled with stickiness, and white spots remain on the whole of the peeled surface: X (6) Container Formability Containers having a length of 13 cm, a width of 18 cm and a depth of 1 cm were formed with the propylene resin laminated sheets coated with the antifogging agents in Tables 3 and 4 by varying the sheet surface temperature from 110° C. to 250° C. in a vacuum forming apparatus manufactured by K.K. Asano Kenkyusho (trade name: KOSMIC MOLDER) under the processing conditions of preliminary heating for 11 seconds, air pressure of 1 kg/cm$^2$, and cooling time for 15 seconds, and their container formabilities were evaluated according to the following evaluation grades.

Evaluation Grade

The sheet sags within 30 mm and can be easily shaped into the container: ○

The sheet sags within the 31 to 50 mm, and a few wrinkles remain in the container: Δ

The sheet sags in 51 mm or more, many wrinkles remain on the surface of the container, or the sheet cannot be shaped into the container due to insufficient preliminary heating: X The present invention can provide containers excellent in heat resistance, antifog property, transparency, rigidity and processability which are required for food containers by coating a propylene resin laminated sheet having a particular ratio and a particular incorporation with a particular coating agent or combining constant processing conditions.

What is claimed is:

1. A process for preparing a propylene resin sheet for thermoforming which comprises subjecting a propylene resin laminated sheet which comprises an intermediate layer of a propylene resin having a density of 0.900 g/cm$^3$ or less and a melt flow rate in the range of 0.3 to 20 g/10 min and propylene resin surface layers laminated on both surfaces of the intermediate layer and having a density in the range of 0.903 to 0.920 g/cm$^3$ and a melt flow rate in the range of 0.3 to 20 g/10 min, the total sheet thickness being in the range of 0.1 to 2 mm, and the total thickness of the both surface layers being ½ or less of the total sheet thickness, said propylene resin for the intermediate layer consisting essentially of a copolymer of propylene and an α-olefin, said copolymer having a propylene content of 90 to 99% by weight; said propylene resin for the surface layers consisting essentially of a propylene resin selected from the group consisting of a propylene homopolymer and a copolymer of propylene having units of propylene of 97% by weight or more; and said propylene resin laminated sheet having a flexural modulus of 1450 to 1850 MPa measured by the method of JIS-K6758, to oxidation treatment so that the wet surface tension of at least one surface of the sheet is in the range of 36 to 55 dyne/cm, and coating the treated surface with an antifogging agent comprising as an effective ingredient a polyglycerol fatty acid ester which contains a saturated fatty acid having 12 to 16 carbon atoms in an amount of 70% by weight or more in relation to the constituent fatty acids and a degree of an average esterification in the range of 12 to 24%.

2. A process for preparing a propylene resin sheet for thermoforming according to claim 1, wherein the propylene resin in the intermediate layer and/or the surface layer is the one having incorporated thereinto 0.01 to 1 part by weight of a nucleating agent in relation to 100 parts by weight of the resin.

3. A process for preparing a propylene resin sheet for thermoforming according to claim 1, wherein the propylene resin in the surface layer is the one having incorporated thereinto 0.01 to 1 part by weight of a slip agent in relation to 100 parts by weight of the resin.

4. A process for preparing a polypropylene resin sheet for thermoforming according to claim 1, wherein the polymerization degree of the polyglycerol is 6 to 12.

5. A propylene resin sheet for thermoforming prepared by the process according to claim 1.

6. A polypropylene resin sheet according to claim 5 in the form of a thermoformed article.

7. A process for preparing a propylene resin sheet for thermoforming according to claim 1, wherein the antifogging agent contains 0.1 to 30% by weight of an anionic surface active agent.

8. A process for preparing a propylene resin sheet for thermoforming according to claim 7, wherein the antifogging agent is applied in an amount of 0.05 to 2 g/m$^2$ based on the solid content.

9. A process for preparing a propylene resin sheet for thermoforming according to claim 7, wherein the intermediate layer comprises a propylene resin into which a linear ethylene-α-olefin copolymer having a density of 0.93 g/cm$^3$ or less and a melt flow rate of 0.1 to 50 g/10 min has been blended in an amount of less than 40% by weight.

10. A process for preparing a propylene resin sheet for thermoforming according to claim 7, wherein the propylene resin in the intermediate layer and/or the surface layer is the one having incorporated thereinto 0.01 to 1 part by weight of a nucleating agent in relation to 100 parts by weight of the resin.

11. A process for preparing a propylene resin sheet for thermoforming according to claim 1, wherein the antifogging agent is applied in an amount of 0.05 to 2 g/m$^2$ based on the solid content.

12. A process for preparing a propylene resin sheet for thermoforming according to claim 11, wherein the intermediate layer comprises a propylene resin into which a linear ethylene-α-olefin copolymer having a density of 0.93 g/cm$^3$ or less and a melt flow rate of 0.1 to 50 g/10 min has been blended in an amount of less than 40% by weight.

13. A process for preparing a propylene resin sheet for thermoforming according to claim 11, wherein the propylene resin in the intermediate layer and/or the surface layer is the one having incorporated thereinto 0.01 to 1 part by weight of a nucleating agent in relation to 100 parts by weight of the resin.

14. A process for preparing a propylene resin sheet for thermoforming according to claim 1, wherein the intermediate layer comprises a propylene resin into which a linear ethylene-α-olefin copolymer having a density of 0.93 g/cm$^3$ or less and a melt flow rate of 0.1 to 50 g/10 min has been blended in an amount of less than 40% by weight.

15. A process for preparing a propylene resin sheet for thermoforming according to claim 14, wherein the propylene resin in the intermediate layer and/or the surface layer is the one having incorporated thereinto 0.01 to 1 part by weight of a nucleating agent in relation to 100 parts by weight of the resin.

16. A propylene resin sheet for thermoforming prepared by the process according to claim 14.

17. A process for preparing a propylene resin sheet for thermoforming which comprises subjecting a propylene resin laminated sheet which comprises an intermediate layer of a propylene resin having a density of 0.900 g/cm$^3$ or less and a melt flow rate in the range of 0.3 to 20 g/10 min and propylene resin surface layers laminated on both surfaces of the intermediate layer and having a density in the range of 0.903 to 0.920 g/cm$^3$ and a melt flow rate in the range of 0.3 to 20 g/10 min, the total sheet thickness being in the range of 0.1 to 2 mm, and the total thickness of the both surface layers being ½ or less of the total sheet thickness, said propylene resin for the intermediate layer consisting essentially of a copolymer of propylene and an α-olefin, said copolymer having a propylene content of 90 to 99% by weight; said proplylene resin for the surface layers consisting essentially of a propylene resin selected from the group consisting of a propylene homopolymer and a copolymer of propylene having units of propylene of 97% by weight or more; and said propylene resin laminated sheet having a flexural modulus of 1450 to 1850 MPa measured by the method of JIS-K6758, to oxidation treatment so that the wet surface tension of at least one surface of the sheet is in the range of 36 to 55 dyne/cm, and coating the treated surface with an antifogging agent which comprises as an effective ingredient a sucrose fatty acid ester containing oleic acid and lauric acid in the constituent fatty acids in a molar ratio of 2:8 to 8:2.

18. A process for preparing a propylene resin sheet for thermoforming according to claim 17, wherein the antifogging agent contains 0.1 to 30% by weight of an anionic surface active agent.

19. A process for preparing a propylene resin sheet for thermoforming according to claim 17, wherein the antifogging agent is applied in an amount of 0.05 to 2 g/m$^2$ based on the solid content.

20. A process for preparing a propylene resin sheet for thermoforming according to claim 17, wherein the intermediate layer comprises a propylene resin into which a linear ethylene-α-olefin copolymer having a density of 0.93 g/cm$^3$ or less and a melt flow rate of 0.1 to 50 g/10 min has been blended in an amount of less than 40% by weight.

21. A process for preparing a propylene resin sheet for thermoforming according to claim 17, wherein the propylene resin in the intermediate layer and/or the surface layer is the one having incorporated thereinto 0.01 to 1 part by weight of a nucleating agent in relation to 100 parts by weight of the resin.

22. A propylene resin sheet for thermoforming prepared by the process according to claim 2.

23. A polypropylene resin sheet according to claim 22 in the form of a thermoformed article.

* * * * *